(12) United States Patent
Ganshin et al.

(10) Patent No.: US 11,131,790 B2
(45) Date of Patent: Sep. 28, 2021

(54) METHOD OF AND SYSTEM FOR GENERATING WEATHER FORECAST

(71) Applicant: YANDEX EUROPE AG, Lucerne (CH)

(72) Inventors: Aleksandr Viktorovich Ganshin, Moscow (RU); Vladimir Sergeevich Ivashkin, s Krivka (RU); Irina Vladimirovna Rudenko, Dolgoprudny (RU); Aleksandr Aleksandrovich Molchanov, Zelenograd (RU); Sergey Aleksandrovich Ovcharenko, Krasnodar (RU); Ruslan Viktorovich Grokhovetsky, Yekaterinburg (RU); Dmitrii Valentinovich Solomentsev, Moscow (RU)

(73) Assignee: YANDEX EUROPE AG, Lucerne (CH)

(*) Notice: Subject to any disclaimer, the term of this patent is extended or adjusted under 35 U.S.C. 154(b) by 199 days.

(21) Appl. No.: 16/587,079

(22) Filed: Sep. 30, 2019

(65) Prior Publication Data

US 2020/0309993 A1 Oct. 1, 2020

(30) Foreign Application Priority Data

Mar. 25, 2019 (RU) .......................... RU2019108456

(51) Int. Cl.
*G01W 1/10* (2006.01)
*G06N 3/04* (2006.01)
*G06N 3/08* (2006.01)

(52) U.S. Cl.
CPC ............ *G01W 1/10* (2013.01); *G06N 3/0454* (2013.01); *G06N 3/084* (2013.01); *G01W 2203/00* (2013.01)

(58) Field of Classification Search
CPC .. G01W 1/10; G01W 2203/00; G06N 3/0454; G06N 3/084; Y02A 90/10
See application file for complete search history.

(56) References Cited

U.S. PATENT DOCUMENTS 5,379,215 A * 1/1995 Kruhoeffer ............. G06T 15/10
702/3
5,796,611 A * 8/1998 Ochiai ..................... G01W 1/10
702/3

(Continued)

FOREIGN PATENT DOCUMENTS

CN 103235890 A 8/2013
CN 105445816 A 3/2016

(Continued)

OTHER PUBLICATIONS

Search Report with regard to the counterpart RU Patent Application No. 2019108456 completed Mar. 25, 2021.

(Continued)

*Primary Examiner* — Mohammad K Islam
(74) *Attorney, Agent, or Firm* — BCF LLP (57) ABSTRACT

A method of generating a weather forecast. The method is executable by a server, the server including a processor, the processor configured to execute a Machine Learning Algorithm (MLA). The method comprises: receiving, by the MLA at the given period of time, satellite data for a given geographical region; based on the satellite data, generating by the MLA, a 3D precipitation map for the given geographical region, based on the 3D precipitation map, generating by the MLA the weather forecast for the given period of time for the given geographical region. The MLA is trained based on a prediction of another MLA (based on meteo radar data) and satellite data.

19 Claims, 5 Drawing Sheets

(56) References Cited

U.S. PATENT DOCUMENTS

| | | | |
|---|---|---|---|
| 9,607,520 B2* | 3/2017 | McCann | G08G 5/0039 |
| 9,869,766 B1* | 1/2018 | Breiholz | G01S 7/003 |
| 10,613,252 B1* | 4/2020 | Mecikalski | G01W 1/10 |
| 10,761,242 B1* | 9/2020 | Mecikalski | G01W 1/16 |
| 10,996,374 B1* | 5/2021 | Nazir | G06K 9/6289 |
| 11,017,306 B2* | 5/2021 | Sood | G06N 5/04 |
| 2013/0339891 A1* | 12/2013 | Blumenberg | G01C 21/3694 |
| | | | 715/771 |
| 2016/0363696 A1* | 12/2016 | Dao | G01W 1/10 |
| 2017/0357029 A1 | 12/2017 | Lakshmanan | |
| 2018/0313975 A1* | 11/2018 | Chen | G06F 16/29 |
| 2018/0372914 A1* | 12/2018 | Yan | G06F 30/20 |
| 2019/0050510 A1* | 2/2019 | Mewes | G06Q 50/02 |
| 2019/0340940 A1* | 11/2019 | Elkabetz | G01W 1/02 |
| 2020/0132884 A1* | 4/2020 | Rothenberg | G06N 7/005 |
| 2020/0150268 A1* | 5/2020 | Maschhoff | H04B 7/18576 |
| 2020/0355846 A1* | 11/2020 | Mecikalski | G01W 1/10 |
| 2021/0166322 A1* | 6/2021 | Allen | G06Q 40/08 |
| 2021/0166340 A1* | 6/2021 | Nikola | G06K 9/00798 |

FOREIGN PATENT DOCUMENTS

| | | | |
|---|---|---|---|
| CN | 107341449 A | 11/2017 | |
| CN | 107632295 A | 1/2018 | |
| CN | 107703564 A | 2/2018 | |
| CN | 108154273 A | 6/2018 | |
| CN | 108508505 A | 9/2018 | |
| CN | 108734357 A | 11/2018 | |
| RU | 2627568 C2 | 8/2017 | |

OTHER PUBLICATIONS

English Abstract for CN103235890 retrieved on Espacenet on Apr. 7, 2021.

English Abstract for CN108508505 retrieved on Espacenet on Apr. 7, 2021.

English Abstract for CN108734357 retrieved on Espacenet on Apr. 7, 2021.

English Abstract for CN107703564 retrieved on Espacenet on Apr. 7, 2021.

English Abstract for CN107341449 retrieved on Espacenet on Apr. 7, 2021.

English Abstract for CN107632295 retrieved on Espacenet on Apr. 7, 2021.

English Abstract for CN108154273 retrieved on Espacenet on Apr. 7, 2021.

Ivashkin et al., "Spatiotemporal Data Fusion for Precipitation Nowcasting", NIPS 2018 Workshop Spatiotemporal Blind Submission, 2018, 5 pages.

English Abstract for CN105445816 retrieved on Espacenet on Sep. 27, 2019.

* cited by examiner

METHOD OF AND SYSTEM FOR GENERATING WEATHER FORECAST

CROSS-REFERENCE

The present application claims priority to Russian Patent Application No. 2019108456, entitled "METHOD OF AND SYSTEM FOR GENERATING WEATHER FORECAST," filed on Mar. 25, 2019, the entirety of which is incorporated herein by reference.

FIELD OF THE TECHNOLOGY

Non-limiting embodiments of the present technology relate to methods and systems for weather forecasting in general and, more particularly to a method of and a system for generating a weather forecast using a machine learning algorithm executed by a computing device.

BACKGROUND

Weather forecasting is widely used in a variety of situations. Weather forecasting can be split into several categories and/or types depending on the purpose. Agricultural forecasts include detailed predictions of the atmospheric precipitation; sea and river forecasts include detailed predictions of wind, waves, atmospheric phenomena, air temperature; aviation forecasts include detailed predictions of wind, visibility, atmospheric phenomena, cloudiness, air temperature, and forecasts for general consumer use include a much more general (i.e. high level) prediction in regard to the cloud cover, precipitation, atmospheric phenomena, wind, temperature, humidity, atmospheric pressure, etc.

A user can receive current weather prediction for a given territory from a variety of sources, e.g. radio stations, television, the Internet, weather apps; just to name a few. At the same time, the accuracy of the current weather parameters can be considered to be reliable enough as it is based on the real data received from the weather stations. The accuracy of the current weather parameters depends on the accuracy of equipment of the data provider. At present, the world meteorological organization (WMO) collects meteorological, climatological, hydrological as well as marine and oceanographic data around the world via more than 15 satellites, 100 anchored buoys, 600 drifting buoys, 3,000 aircrafts, 7,300 ships and around 10,000 ground stations. Member countries of the WMO have access to this data.

The user can also get data representative of forecasted weather parameters for a given moment in time in the future (the given moment in the future, after the current moment of time) for a given territory from either the same and/or other sources. However, the accuracy of the forecast parameters depends on the time of the forecast (i.e. how far in advance the forecast is being executed), the forecast method, the given territory and many other criteria.

For example, depending on the time of the forecast vis-a-vis the time in the future for which the forecast is being generated, the forecast can be categorized as: a very-short-range forecast—up to 12 hours; a short-range forecast—from 12 to 36 hours; a mid-range forecast—from 36 hours to 10 days; a long-range forecast—from 10 days to a season (3 months); and a very-long-range forecast—more than 3 months (a year, a few years). The accuracy of the forecasts generally decreases with the increase of time between the time when the forecast is generated and the time for which the forecast is generated. As an example, the accuracy (reliability) of the very-short-range forecast can be 95-96%, the short-range forecast—85-95%, the mid-range forecast—65-80%, the long-range forecast—60-65%, and the very-long-range forecast—not more than 50%.

The accuracy also depends on the forecasting methods used for generating the forecast. At the moment, the numerical models of weather forecasting are generally considered to be the most accurate and the most reliable of all the known forecasting methods. Put another way, forecasting methods implemented by computational systems for weather forecasting using current weather parameters data. These computational systems can used raw data provided by weather balloons, weather satellites, and ground weather stations.

Furthermore, even in the modern world, activities of individuals depend on weather conditions outside their homes. Plans and activities of the significant part of the population are influenced by temperature and precipitation. Like ancient people used the environmental conditions to plan their hunt, modern people plan their everyday activities considering the probability of rain, cloudiness, and other elements potentially affecting such activities.

Various weather forecast services address this need and provide major weather parameters, such as temperature, intensity and type of precipitation, cloudiness, humidity, pressure, wind direction and speed. These services include the information on the current weather conditions, operational prediction up to 2 hours, which is called "nowcasting", medium-range forecasts up to 10 days, and extended range weather prediction for several months. Yandex.Weather is a major weather forecasting provider in Russia, with approximately 5M daily active users and the monthly audience exceeding 24M unique cross-device users as estimated by Yandex.Radar in December 2018.

One type of a forecast included and provided by search services is a combined weather radar data with neural network-based for super-short-term precipitation forecasting (also known as "further nowcasting") to provide a detailed-level (such as a street or a house) map of predicted precipitation for two hours into the future with 10-minute intervals. The quality of this prediction allows providing personalized and human understandable notifications to users, like "rain will start in half an hour in the place you are heading, don't forget your umbrella".

The data from the precipitation map is also used to adjust the current weather condition (sunny/cloudy/rainy/snowy etc.) as displayed on the main Yandex.Weather website. Partners of Yandex.Weather, most notably the main Yandex.ru portal, Yandex Maps, as well as offline users of radio and television, also rely on these data, at least doubling the effective audience of our precipitation nowcasting product.

One will easily appreciate that nowcasting approach has advantages over traditional weather forecasting methods (i.e. those traditional weather forecasting methods that involve numerical modeling of the atmosphere and cannot provide the exact rain locations (called precipitation fields) on time scales required to determine e.g. which half of the city will be affected by rain in the next hour. Furthermore, traditional weather forecast provides information at hourly resolution, which makes it difficult to distinguish the intervals without rain in the case of short strong precipitation.

Furthermore, users often need a direct answer to a simple question: when will it start (or stop) raining? And, ideally, the answer would look like "heavy rain will start in 10 minutes and will last for 30 minutes". Traditional numerical weather prediction (NWP) models are constrained in prediction strength of precipitation event for a specific location and specific time. At the same time the radar extrapolation products are suitable for accurate precipitation field movement during the first couple of hours, but they fail to predict the precipitation occurrence for further future period of time.

Thus, the main trend in modern nowcasting is to combine high resolution radar data with traditional NWP models.

US patent application 2018/313,975 (published on Nov. 1, 2018 to CHEN) discloses systems, methods, and apparatuses that provide integrated weather forecast products designed to assist operations managers with operational decision-making related to a designated event or set of events. The present disclosure provides a way to process weather data from various sources and in diverse data formats containing varying spatial resolutions and temporal resolutions, in order to generate an integrated and cohesive weather projection product such that the weather projection product is continuous in both spatial and temporal domains relative to a designated event or set of events.

US patent application 2017/357,029 (published Dec. 14, 2017 to LAKSHMANAN) discloses receiving radar observation data for time points at an input layer of a rain rate prediction neural network. The radar observations are forward propagated via hidden layers of the network to determine rain rates for the time points. The rain rates are integrated over a time period, determined based on the time points, to determine a predicted rainfall amount. The predicted rainfall amount is compared with an actual rainfall amount, determined based on received rainfall measurements, to determine an error. If the error does not satisfy certain criteria, then the error is apportioned to each of the time points, the apportioned errors are back propagated via the hidden layers, and weights associated with nodes in the hidden layers are updated. The radar observation data is again forward propagated via the layers, multiplied by the updated weights, and used to determine new rain rates.

Chinese patent application CN 105445816A (published Oct. 3, 2017) discloses a cloud radar and satellite detection and data fusion system. The method of the present invention, by obtaining the millimeter-wave cloud radar detection top height, cloud base height and average reflectance factor, and the satellite image brightness temperature corresponding to the above millimeter-wave cloud radar by trained satellite Temperatures and Millimeter Waves cloud top height of the radar, the neural network processing cloud base height and average reflectance factor, the output of the real-time satellite cloud cover top height value within each brightness temperature corresponding to the area, the cloud base height, average reflectance factor to obtain satellite images covering the top height in the area, the height of the cloud base level and the average reflectivity profile, forecasts for analysis, numerical forecast and atmospheric sciences provide new cloud information.

SUMMARY

Developers of the present technology, have appreciated that even though nowcasting methods developed so far provide a better/more accurate/more targeted forecast when compared to the traditional NWP models, they still suffer from technical problems.

For example, the radar-based precipitation model are constrained by radar locations and thus poorly scalable. The radars themselves are expensive, their installation depends on agreements with local government and populace, and their operation requires trained service personnel.

Taking an example of Russia, the coverage is particularly poor due to the large size of the country, and highly non-uniform population distribution, with many remote regions lacking the infrastructure to operate the radar facility. The similar problems arise for many developing countries with a large population in need of weather services, but no infrastructure to support radar networks.

Thus, developers of the present technology set out to develop systems and methods for precipitation nowcasting based on a combination of the satellite images and NWP models. In broad terms, non-limiting embodiments of the present technology use the precipitation fields obtained from radars and satellite data and then generate nowcasting predictions for a much larger territory using the same or similar model to make predictions. In other words, the non-limiting embodiments of the present technology enable to either enrich radar data with predictions made by a machine learning algorithm based on satellite images or use satellite images to generate synthetic radar data (such as 3D precipitation maps) for areas, where such radar data is not available.

More specifically, the non-limiting embodiments of the present technology are directed to generating a nowcasting based forecast. In this disclosure, the term "nowcasting" is used to denote a weather prediction, including precipitation prediction, that is generated for the current time, such as in a time frame of 2 hours prior and 2 hours after the current (i.e. prediction) moment of time. Naturally, the prediction time span can be more or less that +/−2 hours mentioned in the example immediately above.

The main technical challenge with the prior art approaches to nowcasting is the fact that the nowcasting prediction is based on meteo radar data, which is albeit highly accurate, is not uniformly available for all territories.

Meteoradars being installed only within highly populated cities, low populated cities and towns remain uncovered by meteoradars. Each meteo radar covers 200-250 kilometers horizontally. Normally radars being installed within highly populated cities and do not cover territory of low populated towns. Using an example of Russia, only about 40% of inhabited territories of Russian is covered by meteo radars.

Another issue with meteo radars is blind zones stems out of meteo radars' detection. One will appreciate that radar maps have so called "blind zones"—sectors unavailable for scanning by radar because of surrounding buildings or other non-transparent for radio waves obstacles.

Thus, non-limiting embodiments of the present technology aim to address at least some of the above technical problems by methods that use meteo radars data and satellite data. Broadly speaking, a method in accordance with the non-limiting embodiments of the present technology, can be divided into several stages, each stage executed by an electronic device.

Collecting Data from Meteo Radars

Like any radar, meteo radar analysis is based on a Doppler effect. A meteo radar sends radio waves every 10 minutes, the radio waves get reflected by the environment, including large water drops and the so-reflected wave, in a form of a radio waves response, returns back to the meteo radar. Radio waves response is a reflection and a radial speed data associated therewith represents information about environment including location of water drops and its density.

Based on the radio waves response, the meteo radar forms 3-dimensional (3D) precipitation map that represents atmosphere in 200-250 kilometers horizontally and 10 kilometers vertically.

3D precipitation map depicts areas with large drops of water (larger than 50 micrometers) marked on it. Saturation and color are used to represent density of water drops. The more saturated the color, the higher probability of precipitation. On the precipitation map each pixel of the image equals to 2×2 kilometers of actual landscape. In other words, the 3D map allows predicting the precipitation with up to 2×2 kilometers precision.

At this step meteo radar gathers plurality of sequential 3D precipitation maps and transfers it for further processing to the electronic device.

Generating a Training Dataset for Meteo Radar Nowcasting

The training dataset comprises a plurality of training samples for a first Machine Learning Algorithm (MLA), such as a first neural network (NN).

Each training sample includes an input (i.e. a training object) and a label/target. The input, is a sequence of six 3D precipitation maps, made every 10 minutes. Target is a seventh 3D map that follows sequentially to the sequence of six 3D precipitation maps. In other words, each sequence of six 3D maps is labeled with the seventh 3D map.

Training the First MLA with Meteo Radar Dataset

This training dataset is used to train the first MLA to predict the upcoming 3D map based on previous six 3D maps.

Broadly speaking, it can be said that the first MLA is trained to predict the next state based on a "trend" of the 3D maps. In other words, the first MLA is trained to predict a future state (i.e. the seventh 3D map) based on trends in the past (the past six 3D maps).

More specifically, the first MLA can be fed with a sequence of six 3-dimensional precipitation maps as the input and provided with the seventh 3D atmosphere map as target. Training process can be implemented using any suitable backpropagation algorithm.

Generating a Forecast Prediction Using the Trained First MLA

Based on the sequence of six 3D precipitation maps, the first MLA predicts further seventh 3D precipitation map. Prediction capacity can be, as an example, 2 hours for every 10 minutes.

The first MLA generates features of input 3D precipitation maps within several sequential layers of the first MLA. Each convolutional layer of the first MLA includes a number of filters that are applied to the inputted 3D precipitation maps. Each filter extracts feature of the 3D precipitation maps. Output of the first MLA aggregates extracted features to predict the seventh 3D precipitation map.

The 3D precipitation map depicts predicted precipitation probability. The more saturate a color marked on the predicted seventh 3D precipitation map, the more probable the rain occurrence in the marked location. Within the created 3D precipitation map precipitation probability for each 2×2 kilometers is estimated, the probability being between 0 and 1, as an example.

Using Radar Data Prediction to Train a Second MLA to Generate 3D Precipitation Maps Based on Satellite Data In accordance with the non-limiting embodiments of the present technology, in order to enrich meteo radar nowcasting, satellite data is used.

In order to obtain satellite data, Meteosat-8 satellite can be used. Naturally, other satellites can be used as a source for the satellite data.

As one will appreciate, a satellite is moving around the Earth at its respective speed such that its own location relative to the Earth is not changing (i.e. the satellite has a stationary orbit). Satellites are typically positioned over the $41^{st}$-degree longitude over the Indian ocean. The satellite is configured to capture a photo every 15 minutes. Each photo includes information from 12 channels: 11 channels in visible and infrared diapasons within resolution of 3×3 kilometers and 1 visible channel with a 1×1 kilometers resolution.

As an example, each photo has resolution 3712×3712 pixels or 14 megapixels.

In addition to the satellite photos, data from Global Forecast System (GFS) can be collected. Additionally, calculations of the sun location relative to the horizon can be made. Additionally, information about landscape can be obtained.

Generating a Training Dataset Based on the Satellite Photos

Next, the electronic device generates a training dataset for satellite-based nowcasting, the training dataset including a training object (i.e. input) and target.

As an example, the training object can include: 11 layers of photos made by the satellite; 1 layer of topographical information—information about the associated landscape; 1 layer that represents the high of sun relative to the horizon; 7 layers of meteo data collected by GFS.

As a target (i.e. label for training) 3D precipitation maps generated by the first MLA is used. Each 3D precipitation map has a 2×2 kilometers grid. For each 2×2 kilometers, the 3D map has a prediction of precipitation probability.

It is noted that the prediction of precipitation probability for each 2×2 kilometers has been generated by the above-described meteo radar nowcasting and could be expressed in scale from 0 to 1.

Training a Second MLA with a Training Dataset Including Satellite Photos

The above-generated training dataset is provided as an input to a second MLA, such as a second neural network (NN). A 3D precipitation map is provided as a target output for training the second MLA. Backpropagation algorithm can be applied, such that the deviation of NN calculations from target is used as an error. The error transfers back to weights of the NN and weights are adjusted based on the error. Backpropagation repeats iteratively till the error is minimized As an architecture of the second neural network, U-net NN could be used. U-net architecture allows to calculate rain probability simultaneously for all 3D maps.

Generating a Forecast Prediction by the Second MLA

The so-trained second MLA then generates data for the forecast prediction.

More specifically, the trained U-net NN receives an input (satellite photos of a given geographical region) and forms 3D precipitation map representing the probability of precipitation occurrence in every 2×2 kilometers of the 3D map. In other words, the so-trained second MLA can generate 3D precipitation map for an area where radar data is not available or as an additional/enrichment data for the area for the 3D maps are of poor quality.

As such, it can be said that the non-limiting embodiments of the present technology take advantage of ubiquitous availability of the satellite data. The so-trained second MLA can be used to generate 3D precipitation maps for areas where the radar data is not available (or is poor) to enable generating nowcasting predictions.

The so-generated 3D precipitation maps can be combined with the standard prediction algorithms (such as the NWP discussed above) to generate the final weather prediction, which can be of enriched quality (such as, for example, more accurate or more narrowly targeted to a specific geographic area).

Thus, the non-limiting embodiments of the present technology can be said to generate a prediction of a given territory based on the meteo radar data and satellite photos data, the prediction including the precipitation probability.

Generating a Forecast Prediction Based on Satellite Data for a Given Period in the Future In accordance with the non-limiting embodiments of the present technology, a prediction for a future period of time (such as next two hours and beyond, as an example) can be made. In some non-limiting embodiments of the present technology, this future prediction is executed based on the predictions made by the first MLA and the second MLA described above.

In alternative non-limiting embodiments of the present technology, to create future precipitation prediction, the non-limiting embodiments of the present technology are further configured to generate either synthetic 3D precipitation maps for a given period in time in the future or synthetic satellite photos for the given period in time in the future. This synthetic information is used as an input to the NN.

In order to generate the synthetic 3D precipitation maps, optical flow technology can be used. Optical flow is an approach that is used in computer vision to detect shifts between images. Optical flow algorithm comprises analyzing sequence of images and detecting field of shift vectors in each dot of the image. Based on a previous image and detected field of shift vectors, the optical flow generates a next image. The generated next image represents the next precipitation map for following 15 minutes.

Substantially similar approach can be used for generating synthetic satellite photos.

In some additional non-limiting embodiments, the optical flow algorithm can be used to bridge time intervals of the different prediction models. For example, where meteo radar based data has a capturing interval of X minutes, while satellite data has a capturing interval of Y minutes, where X and Y are not the same, optical flow algorithm can be used to generate synthetic data for one or more of the meteo radar data and the satellite data to bring it to a single capturing time interval.

More specifically, 3D map created based on the meteo radars data has a gap (typically, of every 10 minutes), but 3D map created based on the satellite have 15 minutes gap. To resolve this issue Optical Flow open source can be used. Optical flow allows adding missing intermediate images in a sequence of changing photos.

In accordance with the non-limiting embodiments of the present technology, the prediction of the nowcasting forecast comprises enriching the forecast prediction based on satellite data. Forecast prediction generated based on the radar data has limited coverage in terms of the covered territory, but predictions generated based on the satellite data have no such limitations. To cover larger territory within forecast prediction 3D map created by the NN trained on meteo radars data is combined with the 3D precipitation map created by the NN trained based on the satellite data.

As such, in accordance with a first broad aspect of the present technology, there is provided a method of generating a weather forecast, the method executable by a server. The server includes a processor, the processor configured to execute a Machine Learning Algorithm (MLA). The method comprises: receiving, by the MLA at a given period of time, an indication of meteo radar data for a given geographical region, the meteo radar data being represented as a pre-determined number of sequential 3D precipitation maps having been captured before the given period of time; receiving, by the MLA satellite data for the given geographical region for the given period of time; based on the satellite data, generating by the MLA, a further sequential 3D precipitation map, which follows the pre-determined number of sequential 3D precipitation maps, the further sequential 3D map being associated with a period of time after the given period of time; based on the pre-determined number of sequential 3D precipitation maps and the further sequential 3D precipitation map, generating by the MLA the weather forecast for the given period of time.

In some non-limiting implementations of the method, the weather forecast is a nowcasting weather prediction.

In some non-limiting implementations of the method, the nowcasting weather prediction is associated with an ultra-short prediction time span.

In some non-limiting implementations of the method, the ultra-short prediction time span is within two hours of the given period of time.

In some non-limiting implementations of the method, the generating the weather forecast further comprises generating the weather forecast for a future period of time after the given period of time.

In some non-limiting implementations of the method, the generation of the further sequential 3D map comprises applying an optical flow technology.

In some non-limiting implementations of the method, the optical flow technology is to generate at least one of: future 3D precipitation maps based on the pre-determined number of sequential 3D precipitation maps; future satellite data based on the satellite data.

In some non-limiting implementations of the method, the generating by the MLA the weather forecast for the given period of time is for a prediction geographical region, which is larger than the given geographical region.

In some non-limiting implementations of the method, the MLA comprises a first MLA and a second MLA.

In some non-limiting implementations of the method, the first MLA is configured to predict the further sequential 3D map based on the pre-determined number of sequential 3D precipitation maps.

In some non-limiting implementations of the method, the predetermined number is six.

In some non-limiting implementations of the method, the first MLA is a Neural Network (NN).

In some non-limiting implementations of the method, the second MLA is configured to predict the further sequential 3D precipitation map based on the satellite data.

In some non-limiting implementations of the method, the second MLA is a Neural Network (NN).

In some non-limiting implementations of the method, the Neural Network (NN) comprises a U-net NN.

In some non-limiting implementations of the method, the method further comprises training the second MLA, wherein the second MLA is trained based on a training set, the training set including a training object and a training label; and wherein: the training object comprises the satellite data; the training label comprises a prediction output of the first MLA, the prediction output being a further sequential 3D map.

In some non-limiting implementations of the method, the satellite data comprises: a plurality of layers of photos made by the satellite; a layer of topographical information; a layer that represents the high of sun relative to the horizon; a plurality of layers of meteo data collected by a Global Forecast System.

In accordance with another broad aspect of the present technology, there is provided a method of generating a weather forecast, the method executable by a server. The server includes a processor, the processor configured to execute a Machine Learning Algorithm (MLA). The method comprises: receiving, by the MLA at a given period of time, an indication of meteo radar data for a given geographical region, the meteo radar data having been captured before the given period of time; receiving, by the MLA satellite data for the given geographical region for the given period of time; based on the satellite data, generating by the MLA, an enrichment data; the enrichment data being predicted meteo data for at least one of: a second geographical region being at least partially different from the given geographical region; and a period of time after the given period of time; based on the meteo radar data and the enrichment data, generating by the MLA the weather forecast.

In some non-limiting implementations of the method, the weather forecast is for one of: the given period of time; a period of time after the given period of time; for given geographical region; for the second geographical region.

In accordance with another broad aspect of the present technology, there is provided method of generating a weather forecast, the method executable by a server, the server including a processor. The processor is configured to execute a Machine Learning Algorithm (MLA). The method comprises: receiving, by the MLA at a given period of time, satellite data for a given geographical region; based on the satellite data, generating by the MLA, a 3D precipitation map for the given geographical region; based on the 3D precipitation map, generating by the MLA the weather forecast for the given period of time for the given geographical region.

In some non-limiting implementations of the present technology, the MLA is a first MLA, and the method further comprises: training the first MLA by: receiving, by a second MLA at a training period of time, an indication of meteo radar data for a training geographical region, the meteo radar data being represented as a pre-determined number of sequential 3D precipitation maps having been captured before the given period of time; generating, by the second MLA, a prediction of a further sequential 3D precipitation map, which follows the pre-determined number of sequential 3D precipitation maps, the further sequential 3D map being associated with a period of time after the training period of time; receiving, by the first MLA at the given period of time, satellite data for the training geographical region; based on the satellite data, training the first MLA to generate a prediction of a 3D precipitation map by providing to the first MLA a training set including: the satellite data as a training object; the prediction of the further sequential 3D precipitation map made by the second MLA as a target.

In the context of the present specification, a "server" is a computer program that is running on appropriate hardware and is capable of receiving requests (e.g. from electronic devices) over the network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both cases are included within the expression "at least one server".

In the context of the present specification, "electronic device" (or "computer device") is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

In this context, terms a "first", a "second", a "third", etc. were used as ordinal numbers only to show the difference between these nouns and not to describe any particular type of relationship between them.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (descriptions, advertisements, messages, etc.), documents, spreadsheets, etc.

In the context of the present specification, unless expressly provided otherwise, an "indication" to a digital object can the digital object itself or a pointer, reference, link, or other indirect mechanism enabling the recipient of the indication to locate a network, memory, database, or other computer-readable medium location from which the digital object may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of a digital object will take the form of a database key for an entry in a particular table of a predetermined database containing the digital object, then the sending of the database key is all that is required to effectively convey the digital object to the recipient, even though the digital object itself was not transmitted as between the sender and the recipient of the indication.

In the context of the present specification, an "object location" is a location of a geographical object, namely, a specific region, city, area, airport, railroad station, etc. Specific geographical coordinates, for example, geolocation data, which can be received by a server from an electronic device via a communication network, can also be used as an object location.

In the context of the present specification, the expression "data storage" is intended to include media of any nature and kind whatsoever, including RAM, ROM, disks (CD-ROMs, DVDs, floppy disks, hard drivers, etc.), USB keys, solid state-drives, tape drives, etc.

Implementations of the present technology each have at least one of the above-mentioned object and/or aspects.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

An Appendix A is provided at the end of the present specification. The Appendix A includes a copy of a yet to be published article entitled *"Precipitation nowcasting with satellite imagery"*. This article provide additional background information, description of implementations of the non-limiting embodiments of the present technology, as well as some additional examples. The entirety of this article is incorporated herein by reference in its entirety, in all those jurisdictions where such incorporation by reference is allowed.

DETAILED DESCRIPTION

The examples and conditional language recited herein are principally intended to aid the reader in understanding the principles of the present technology and not to limit its scope to such specifically recited examples and conditions.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Figure 1:
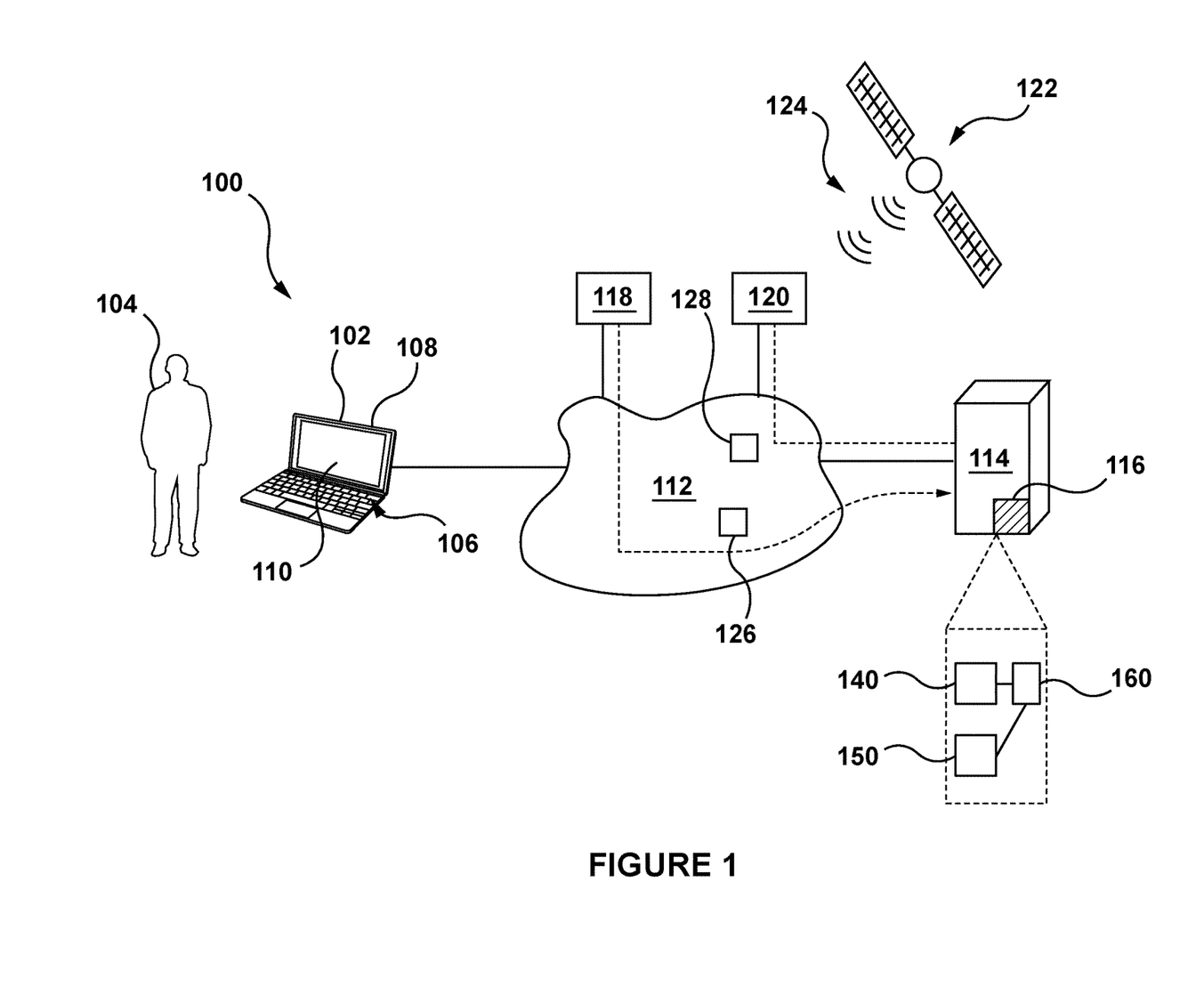
FIG. 1 is a schematic diagram illustrating a system, the system being implemented in accordance with non-limiting embodiments of the present technology.

FIG. 1 depicts a schematic diagram of a computer system 100. It is to be expressly understood that the computer system 100 is merely one possible implementation of the present technology. In some cases, what are believed to be helpful examples of modifications to the computer system 100 may also be set forth below. This description is not intended to define the scope or set forth the bounds of the present technology. In some cases, what are believed to be helpful examples of modifications to computer system 100 may also be set forth below. This is done merely as an aid to understanding, and, again, not to define the scope or set forth the bounds of the present technology. These modifications are not an exhaustive list, and, as a person skilled in the art would understand, other modifications are likely possible. In addition it is to be understood that the computer system 100 may provide in certain instances simple implementations of the present technology, and that where such is the case they have been presented in this manner as an aid to understanding. As persons skilled in the art would understand, various implementations of the present technology may be of a greater complexity.

The computer system 100 comprises an electronic device 102. The electronic device 102 is associated with a user 104 and, as such, can sometimes be referred to as a "client device". It should be noted that the fact that the electronic device 102 is associated with the user 104 does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises a permanent storage 106. The permanent storage 106 may encompass one or more storage media and generally provides a place to store computer-executable instructions executable by a processor 108. By way of an example, the permanent storage 106 may be implemented as a computer-readable storage medium including Read-Only Memory (ROM), hard disk drives (HDDs), solid-state drives (SSDs), and flash-memory cards.

The electronic device 102 comprises hardware and/or software and/or firmware (or a combination thereof) to execute a weather application 110. Generally speaking, the weather application 110 is capable of hands-free activation in response to one or more "hot words", and able to perform tasks or services in response to a command received by the user 104. For example, the weather application 110 may be implemented as an YANDEX.WEATHER application (provided by Yandex LLC of Lev Tolstoy Street, No. 16, Moscow, 119021, Russia). Alternatively, the weather application 110 can be implemented as a browser application, with the user 104 accessing a weather portal or another weather service to obtain a weather prediction. For example, the weather portal can be associated with a news agency, or another provider of weather forecasting services. Alternatively or additionally, the weather application 110 can be a "native application" for the electronic device. For example, in those embodiments of the present technology, where the electronic device 102 is implemented as a smart phone, such as for example APPLE branded smart phone, the weather application 110 can be implemented as WEATHER app provided by the operating system (i.e. iOS) of the electronic device 102.

The electronic device 102 is coupled, via a communication network 112, to a server 114.

The server 114 may be implemented as a conventional computer server. In an example of an embodiment of the present technology, the server 114 may be implemented as a Dell™ PowerEdge™ Server running the Microsoft™ Windows Server™ operating system. Needless to say, the server 114 may be implemented in any other suitable hardware and/or software and/or firmware or a combination thereof. In this non-limiting embodiment of the present technology, the server 114 is implemented as a single server. In alternative non-limiting embodiments of the present technology, the functionality of the server 114 may be distributed and may be implemented via multiple servers.

The implementation of the server 114 is well known. However, briefly speaking, the server 114 comprises a communication interface (not depicted) structured and configured to communicate with various entities via the communication network 112. The server 114 also comprises at least one processor 116 operationally connected with the communication interface structured and configured to execute various processes that will be described herein.

Also communicatively coupled to the communication network 112 is a meteo data source 118 and a satellite data source 120.

Broadly speaking, the meteo data source 118 is configured to transmit to the server 114, an indication of meteo radar data 126 for a given geographical region. In accordance with the non-limiting embodiments of the present technology, the meteo radar data 126 can be represented as a pre-determined number of sequential 3D precipitation maps having been captured before the given period of time. The pre-determined number of sequential 3D precipitation maps can be six.

The meteo data source 118 can generate the meteo radar data 126 based on a reading of a meteo radar (not depicted). As has been alluded to above, the meteo data source 118 can receive the data from the meteo radar, which has generated the meteo data using a meteo radar analysis that is based on a Doppler effect. The meteo radar sends radio waves every 10 minutes, the radio waves get reflected by the environment, including large water drops and the so-reflected wave, in a form of a radio waves response, returns back to the meteo radar. Radio waves response is a reflection and a radial speed data associated therewith represents information about environment including location of water drops and its density. Based on the radio waves response, the meteo radar forms 3-dimensional (3D) precipitation map that represents atmosphere in 200-250 kilometers horizontally and 10 kilometers vertically.

3D precipitation map depicts areas with large drops of water (larger than 50 micrometers) marked on it. Saturation and color are used to represent density of water drops. The more saturated the color, the higher probability of precipitation. On the 3D precipitation map each pixel of the image represents 2×2 kilometers of actual landscape. In other words, the 3D precipitation map allows predicting the precipitation with up to 2×2 kilometers precision.

The satellite data source 120 is configured to transmit to the server 114 an indication of satellite data 128 for the given geographical region. The satellite data source 120 generates the satellite data 128 based on signals 124 received from a satellite 122.

In some embodiments of the present technology, the satellite 122 can be a geo-stationary satellite. As has been alluded to above, the satellite 122 can be a satellite is moving around the Earth at its respective speed such that its own location relative to the Earth is not changing (i.e. the satellite has a stationary orbit). Such satellites are typically positioned over the $41^{st}$-degree longitude over the Indian Ocean.

The satellite 122 is configured to capture a photo every 15 minutes. Each photo includes information from 12 channels: 11 channels in visible and infrared diapasons within resolution of 3×3 kilometers and 1 visible channel with a 1×1 kilometers resolution. It should be understood that the satellite 122 can be configured to take photos at a different capturing frequency, as we all with different content and/or different breakdown of channels and/or a different number of the channels. As an example, each photo has resolution 3712×3712 pixels or 14 megapixels.

In a specific non-limiting embodiment of the present technology, the satellite 122 can be implemented as the Meteosat-8 satellite can be used. Naturally, other satellites can be used as a source for the satellite data 128.

One (or more) of the meteo data source 118, the satellite data source 120, and the server 114 can receive an indication of the additional information. More specifically, one (or more) of the meteo data source 118, the satellite data source 120, and the server 114 can receive the indication information. The information can be data from Global Forecast System (GFS). The data can be implanted as a weather prediction for the given geographical region. The Global Forecast System (GFS) is a global numerical weather prediction system containing a global computer model and variation analysis run by the United States' National Weather Service (NWS).

Additionally, one or more of the meteo data source 118, the satellite data source 120, and the server 114 can receive or generate an indication of the calculations of the sun location relative to the horizon.

Additionally, one or more of the meteo data source 118, the satellite data source 120, and the server 114 can receive or generate an indication of information about landscape associated with the given geographical region can be obtained.

It is noted that even though the meteo data source 118 and the satellite data source 120 are depicted as separate entities from each other, they can be implemented as a single entity. Furthermore, the meteo data source 118 and the satellite data source 120 can be implemented as a single entity with the server 114.

The processor 116 of the server 114 is configured to execute a first Machine Learning Algorithm (MLA) 140. The processor 116 of the server 114 is further configured to execute a second Machine Learning Algorithm (MLA) 150. Finally, the processor 116 of the server 114 is further configured to execute a Machine Learning Algorithm (MLA) training routine 160 or MLATR 160, for short.

It should be noted that even though the first MLA 140, the second MLA 150 and the MLATR 160 have been depicted as separate entities, this does not need to be so. For example, the first MLA 140 and the second MLA 150 can be implemented by a single MLA, whereby the second MLA 150 can be thought of as a further trained (or retrained) first MLA 140. By the same token, each one of the first MLA 140, the second MLA 150 and the MLATR 160 can be in themselves distributed, i.e. can be implemented in several processes executed by one or more computing devices, including the server 114, as well as other servers potentially present within the architecture of the computer system 100.

The first MLA 140 can be implemented as a Neural Network (NN). Generally speaking, a given NN consists of a group of interconnected artificial "neurons", which process information using a connectionist approach to computation.

NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus, rather than trying to determine complex statistical arrangements or mathematical algorithms for a given situation; the given NN tries to provide an "intuitive" answer based on a "feeling" for a situation.

NNs are commonly used in many such situations where it is only important to know an output based on a given input, but exactly how that output is derived is of lesser importance or is unimportant. For example, NNs are commonly used to optimize the distribution of web-traffic between servers, data comparison and processing, clustering, including filtering, vector embedding, and the like.

In some non-limiting embodiments of the present technology, the first MLA 140 is implemented as a convolutional NN.

The second MLA 150 can also be implemented as the NN. As an architecture of neural network of the second MLA 150, U-net NN could be used. U-net architecture allows to calculate rain probability simultaneously for all 3D maps. However, it should be noted that in alternative non-limiting embodiments of the present technology, other types of the NN and other types of MLAs can be used.

Figure 2:
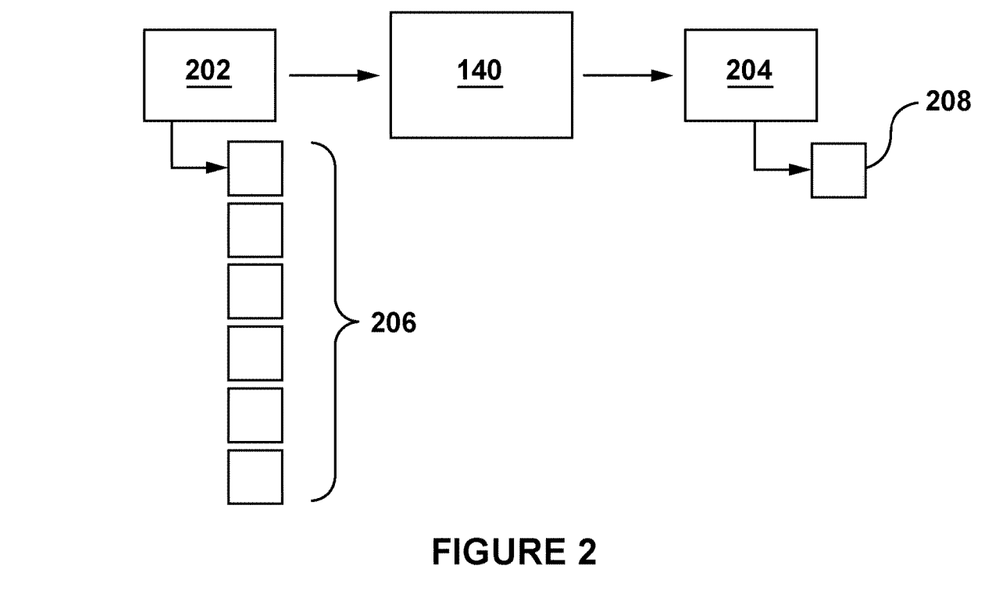
FIG. 2 schematically depicts operation of a first machine learning algorithm executed by a server of the system of FIG. 1.

With brief reference to FIG. 2, which schematically depicts operation of the first MLA 140, broadly speaking, the purpose of the first MLA 140 is to generate, based on an input 202, a predicted output 204. In accordance with the non-limiting embodiments of the present technology, the input 202 comprises a sequence of six 3D precipitation maps 206 (as an example of a pre-determined number of 3D perception maps), and the predicted output 204 comprises a further seventh 3D atmosphere map 208.

More specifically, the first MLA 140 generates features of the input 202 (being in the form of input 3D maps, namely the sequence of six 3D precipitation maps 206, within several sequential layers of the first MLA 140 being implemented as the NN.

Each convolutional layer of the first MLA 140 being implemented as the NN includes a number of filters that are applied to the input 202. Each filter extracts feature of the input 202. The predicted output 204 of the first MLA 140 being implemented as the NN aggregates extracted features to predict the seventh 3D map.

The seventh 3D map, in a sense, is used to illustrate a predicted precipitation occurrence on each location of the seventh 3D map. The more saturate a color marked on the predicted seventh 3D map, the more probable the rain occurrence in the marked location. Within the predicted seventh 3D map, a precipitation probability for each 2×2 kilometers is estimated, the probability being expressed in a range between 0 and 1, as an example.

Figure 3:
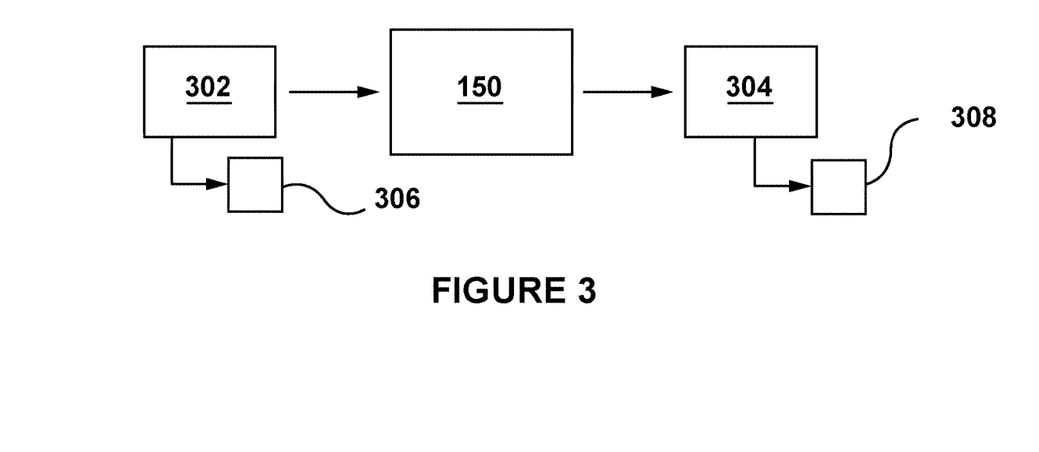
FIG. 3 schematically depicts operation of a second machine learning algorithm executed by a server of the system of FIG. 1.

With reference to FIG. 3, which schematically depicts operation of the second MLA 150, broadly speaking, the purpose of the second MLA 150 is to generate a predicted 3D map based on the satellite data 128 for the given geographical region associated with the satellite data 128. More specifically, the second MLA 150 is configured to generate, based on an input 302, a predicted output 304.

In accordance with the non-limiting embodiments of the present technology, the input 302 comprises the satellite data 128 in a form of a satellite image 306. The predicted output 304 comprises a predicted 3D precipitation map 308 for the associated geographical region.

As is well known, in order for the first MLA 140 and the second MLA 150 to render their respective predictions, in use, the first MLA 140 and the second MLA 150 have to be first "trained". To this end, the MLATR 160 is configured to execute the training routines for the first MLA 140 and the second MLA 150.

In accordance with at least some non-limiting embodiments of the present technology, the MLATR 160 executes the training of the first MLA 140 and the second MLA 150 in sequence. In some embodiments of the present technology, a prediction output of the first MLA 140 is used to train the second MLA 150.

Training the First MLA 140

The MLATR 160 receives meteo radar data 126 for a given geographical region. In accordance with the non-limiting embodiments of the present technology, the meteo radar data 126 can be represented as a pre-determined number of sequential 3D precipitation maps having been captured before the given period of time. The pre-determined number of sequential 3D precipitation maps can be six.

As has been alluded to above, like any radar, meteo radar analysis is based on a Doppler effect. A meteo radar sends radio waves every 10 minutes, the radio waves get reflected by the environment, including large water drops and the so-reflected wave, in a form of a radio waves response, returns back to the meteo radar. Radio waves response is a reflection and a radial speed data associated therewith represents information about environment including location of water drops and its density.

Based on the radio waves response, the meteo data source 118 forms 3-dimensional (3D) precipitation map that represents atmosphere in 200-250 kilometers horizontally and 10 kilometers vertically, as an example.

A 3D precipitation map depicts areas with large drops of water (larger than 50 micrometers) marked on it. Saturation and color are used to represent density of water drops. The more saturated the color, the higher probability of precipitation. On the precipitation map each pixel of the image equals to 2×2 kilometers of actual landscape. In other words, the 3D map allows predicting the precipitation with up to 2×2 kilometers precision.

Generating a Training Dataset for the First MLA 140

The MLATR 160 then generates a training dataset that includes a plurality of training samples for the first MLA 140. Each training sample includes an input (i.e. a training object) and a label/target.

The input, is a sequence of six 3D precipitation maps, made every pre-determined period of time, such as for example, 10 minutes. Target is a seventh 3D map that follows sequentially to the sequence of six 3D precipitation maps. In other words, each sequence of six 3D maps is labeled, by the MLATR 160, with the seventh 3D map. This training dataset is used to train the first MLA 140 to predict the upcoming 3D map based on previous pre-determined number of 3D maps (six in this example).

Broadly speaking, it can be said that the first MLA 140 is trained to predict the next state based on a "trend" of the 3D maps. In other words, the first MLA 140 is trained to predict a future state (i.e. the seventh 3D map) based on trends in the past (the past six 3D maps).

Training the Second MLA 150

The MLATR 160 uses a prediction of the first MLA 140 to train the second MLA 150. More specifically, the MLATR 160 trains the second MLA 150 to predict (i.e. to generate) a 3D precipitation map for a given geographical region based on satellite data 128 (i.e. a satellite image of the geographic area). As an example, in some non-limiting embodiments of the present technology, each a satellite image can be a satellite photo with a resolution 3712×3712 pixels (i.e. 14 megapixels).

It is noted that the MLATR 160 can use additional information for training the second MLA 150. These additional information can include one or more of: data from Global Forecast System (GFS), calculations of the sun location relative to the horizon can be made, and information about landscape of the associated geographical region.

Generating a Training Dataset Based on the Satellite Photos

Next, the MLATR 160 generates a training dataset for the second MLA 150. The training dataset includes a plurality of training pairs, each training pair including: a training object (i.e. input) and target.

As an example, the training object can include a satellite image. In another embodiments, the training object can include satellite image information and additional information, more particularly: 11 layers of photos made by the satellite; 1 layer of topographical information—information about the associated landscape; 1 layer that represents the high of sun relative to the horizon; 7 layers of meteo data collected by GFS.

As a target (i.e. label for training), the MLATR 160 uses a 3D precipitation maps generated by the meteo radars. Each 3D precipitation map has a 2×2 kilometers grid. For each 2×2 kilometers, the 3D map has a prediction of precipitation probability. It is noted that the prediction of precipitation probability for each 2×2 kilometers has been generated by the above-described meteo radar nowcasting and could be expressed in scale from 0 to 1.

Training the Second MLA 150 with the Training Dataset Including Satellite Photos The above-generated training dataset is provided as an input to the second MLA 150. The MLATR 160 can use a backpropagation algorithm for the training of the second MLA 150, such that the deviation (i.e. an error) of the prediction made by the second MLA 150 from the target (i.e. the 3D precipitation map generated by the first MLA 140) is used as an error. The error transfers back to weights of the second MLA 150 and weights are adjusted based on the error. Backpropagation repeats iteratively till the error is minimized.

Generating a Forecast Prediction Using the Second MLA 150 Having Been Trained with Training Dataset Including Satellite Photos The so-trained second MLA 150 then generates a forecast prediction.

More specifically, the so-rained second MLA 150 receives, during an in-use phase, the input 302 (in the form of the satellite image 306 for the given geographical region where the weather prediction is required) and generates the predicted output 304 in a form of a predicted 3D precipitation map 308 representing the probability of precipitation occurrence in every 2×2 kilometers of the predicted 3D precipitation map 308 (i.e. in the associated geographical region).

Thus, it can be said that the second MLA 150 generate a prediction for a given territory based on the predicted meteo radar data (i.e. the predicted 3D precipitation map 308), which is predicted based on the satellite photos data, the prediction including the precipitation probability.

The so-generated prediction (i.e. the predicted 3D precipitation map 308) can be used to generate the weather forecast. It is noted that the predicted 3D precipitation map 308 can be used together with the actual meteo radar data 126 (i.e. to enrich the meteo radar data 126) or instead of (i.e. in those areas where the actual meteo radar data 126 is not available).

It is also noted that the predicted 3D precipitation map 308 can be used (together or without the actual meteo radar data 126) to generate the weather prediction using a plethora of techniques, including the numerical weather prediction (NWP).

Generating a Forecast Prediction Based on Satellite Data for a Given Period of Time in the Future The above described prediction by the second MLA 150 is executed for the current time—i.e. the second MLA 150 has been trained to create the predicted 3D precipitation map 308 based on the current and past satellite photos.

In accordance with the non-limiting embodiments of the present technology, a prediction for a future period of time (such as next two hours, as an example) can also be made. Thus, to create future precipitation prediction, the second MLA 150 (and/or the first MLA 140) is further configured to generate either synthetic 3D precipitation maps for the given period in time in the future or synthetic satellite photos for the given period in time in the future.

This synthetic information is used as an input to the first MLA 140 and/or the second MLA 150. In order to generate the synthetic 3D precipitation maps or the synthetic satellite photos, optical flow technology can be used.

Optical flow is an approach that is used in computer vision to detect shifts between images. Optical flow algorithm comprises analyzing sequence of images and detecting field of shift vectors in each dot of the image.

For the synthetic 3D precipitation maps, based on a previous image and detected field of shift vectors, the optical flow generates a next image. The generated next image represents the next 3D precipitation map for following 15 minutes.

Substantially similar approach can be used for generating synthetic satellite photos.

Figure 4:
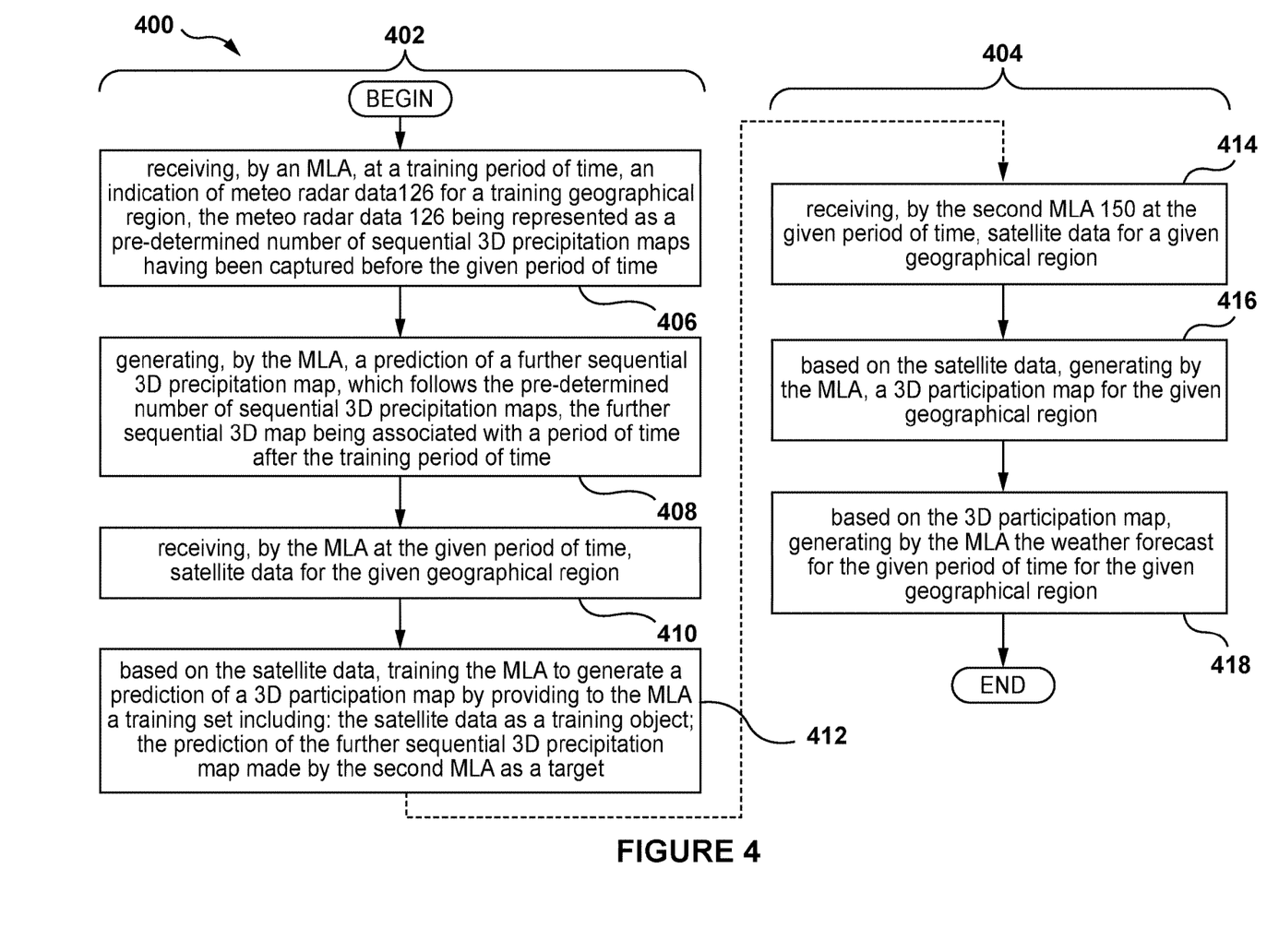
FIG. 4 depicts a flowchart of a method of creating a weather forecast implemented by the server in the system of FIG. 1, the method executed according to non-limiting embodiments of the present technology.

Given the architecture described above, it is possible to implement a method of generating a weather forecast. With reference to FIG. 4, there is depicted a non-limiting embodiment of a method 400, the method 400 being implemented in accordance to some non-limiting embodiments of the present technology. The method 400 can be broadly divided into two stages—a training stage 402 and an in-use stage 404. The method 400 can be executed by the processor 116 of the server 114. More specifically, the training stage 402 can be implemented by the MLATR 160 and the in-use stage 404 can be implemented by the second MLA 150.

Step 406—Receiving, by an MLA, at a Training Period of Time, an Indication of Meteo Radar Data 126 for a Training Geographical Region, the Meteo Radar Data 126 Being Represented as a Pre-Determined Number of Sequential 3D Precipitation Maps Having Been Captured Before the Given Period of Time At step 406, the MLATR 160 receives the indication of meteo radar data 126 for a training geographical region, the meteo radar data 126 being represented as a pre-determined number of sequential 3D precipitation maps having been captured before the given period of time.

As has been alluded to above, the step 406 is executed during a training period of time. It is further noted that that the training geographical region is the region for which the meteo radar data 126 is available from the meteo data source 118. It is also noted that the training geographical region can be different than the given region for which the weather prediction will be executed.

Step 408—Generating, by the MLA, a Prediction of a Further Sequential 3D Precipitation Map, which Follows the Pre-Determined Number of Sequential 3D Precipitation Maps, the Further Sequential 3D Map Being Associated with a Period of Time After the Training Period of Time At step 408, the MLATR 160 causes the first MLA 140 to generate a prediction of a further sequential 3D precipitation map, which follows the pre-determined number of sequential 3D precipitation maps, the further sequential 3D map being associated with a period of time after the training period of time.

It will be recalled that the first MLA 140 has been trained to generate such prediction based on a pre-determine number of sequential 3D maps. In some non-limiting embodiments of the present technology, the pre-determined number can be six.

Step 410—Receiving, by the MLA at the Given Period of Time, Satellite Data for the Given Geographical Region At step 410, the MLATR 160 receives the satellite data 128 for the given geographical region. As has been alluded to above, the satellite data 128 is received from the satellite data source 120. It has also been alluded to that the satellite data 128 can be in a form of the a satellite image 306.

Step 412—Based on the Satellite Data, Training the MLA to Generate a Prediction of a 3D Precipitation Map by Providing to the MLA a Training Set Including: the Satellite Data as a Training Object; the Prediction of the Further Sequential 3D Precipitation Map Made by the Second MLA as a Target At step 412, the MLATR 160, based on the satellite data, executes training the second MLA 150 to generate a prediction of a 3D precipitation map by providing to the second MLA 150 a plurality of training sets, each training set including: the satellite data 128 as a training object; the prediction of the further sequential 3D precipitation map made by the second MLA at step 408 as a target.

Once the second MLA 150 has been sufficiently trained (as determined by any appropriate metric known in the field of MLAs and training of MLAs), the method 400 can be used in the in-use stage 404.

Step 414—Receiving, by the Second MLA 150 at the Given Period of Time, Satellite Data for a Given Geographical Region At step 414, the second MLA 150 receives at an in-use period of time, the satellite data 128 for a geographical region for which a weather prediction is required.

Step 416—Based on the Satellite Data, Generating by the MLA, a 3D Precipitation Map for the Given Geographical Region At step 416, the second MLA 150, based on the satellite data, generates the predicted 3D precipitation map 308 for the geographical region.

Step 418—Based on the 3D Precipitation Map, Generating by the MLA the Weather Forecast for the Given Period of Time for the Given Geographical Region At step 418, the second MLA 150 generates, based at least on the 3D precipitation map, the weather forecast for the given period of time for the given geographical region.

As has been described above, the second MLA 150 can generate the weather forecast based on the predicted 3D precipitation map 308 or based on a combination of the 3D precipitation map 308 the actual meteo radar data 126 for the given geographical region.

During step 418, any suitable numerical weather prediction (NWP) can be used.

Other Specific Implementations of the Method for Generating a Weather Forecast

Figure 5:
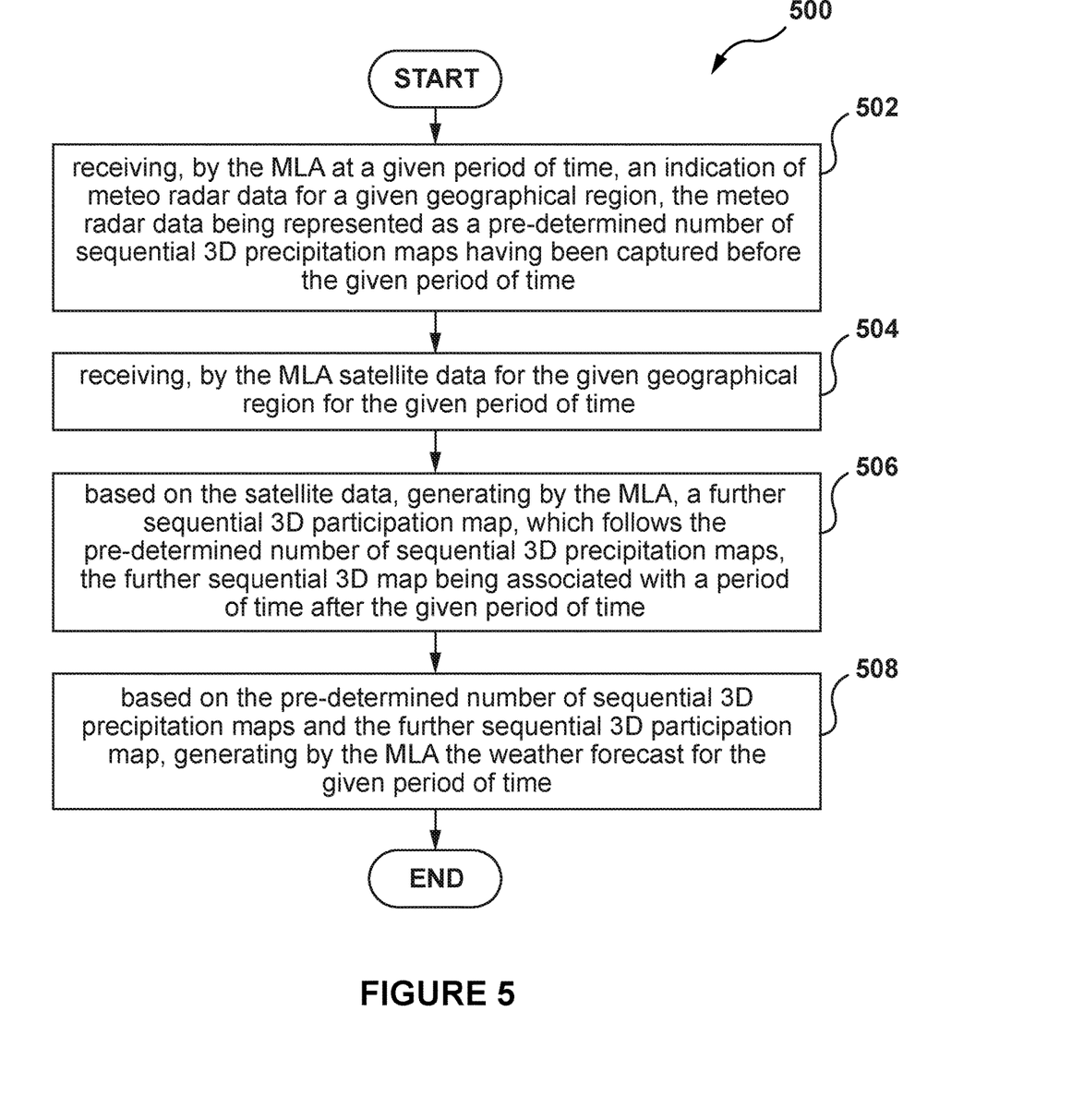
FIG. 5 depicts a flowchart of a method of creating a weather forecast implemented by the server in the system of FIG. 1, the method executed according to additional non-limiting embodiments of the present technology.

With reference to FIG. 5, there is depicted a flow chart of a method 500, the method 500 being executable in accordance with alternative non-limiting embodiments of the present technology.

The method 500 is a method of generating a weather forecast, the method 500 executable by the processor 116 of the server 114, the processor 116 being configured to execute a Machine Learning Algorithm (MLA), such as the above-mentioned first MLA 140, the second MLA 150 and the MLATR 160.

Step 502—Receiving, by the MLA at a Given Period of Time, an Indication of Meteo Radar Data for a Given Geographical Region, the Meteo Radar Data Being Represented as a Pre-Determined Number of Sequential 3D Precipitation Maps Having Been Captured Before the Given Period of Time At step 502, the first MLA 140 receives, at a given period of time, an indication of meteo radar data 126 for a given geographical region, the meteo radar data 126 being represented as a pre-determined number of sequential 3D precipitation maps having been captured before the given period of time.

Step 504—Receiving, by the MLA Satellite Data for the Given Geographical Region for the Given Period of Time At step 504, the second MLA 150 receives satellite data 128 for the given geographical region for the given period of time.

Step 506—Based on the Satellite Data, Generating by the MLA, a Further Sequential 3D Precipitation Map, which Follows the Pre-Determined Number of Sequential 3D Precipitation Maps, the Further Sequential 3D Map Being Associated with a Period of Time After the Given Period of Time At step 506, the second MLA 150 generates, based on the satellite data, a further sequential 3D precipitation map, which follows the pre-determined number of sequential 3D precipitation maps, the further sequential 3D map being associated with a period of time after the given period of time.

Step 508—Based on the Pre-Determined Number of Sequential 3D Precipitation Maps and the Further Sequential 3D Precipitation Map, Generating by the MLA the Weather Forecast for the Given Period of Time At step 508, the second MLA 150, based on the pre-determined number of sequential 3D precipitation maps and the further sequential 3D precipitation map, generates the weather forecast for the given period of time.

In some embodiments of the method 400 and/or method 500, the weather forecast is a nowcasting weather prediction.

In some embodiments of the method 400 and/or method 500, the nowcasting weather prediction is associated with an ultra-short prediction time span.

In some embodiments of the method 400 and/or the method 500, the ultra-short prediction time span is within two hours of the given period of time.

In some embodiments of the method 400 and/or the method 500, the generating the weather forecast further comprises generating the weather forecast for a future period of time after the period of time after the given period of time.

In some embodiments of the method 400 and/or the method 500, the generation of the further sequential 3D map comprises applying an optical flow technology.

In some embodiments of the method 400 and/or the method 500, the applying the optical flow technology is to generate at least one of: future 3D precipitation maps based on the pre-determined number of sequential 3D precipitation maps; future satellite data based on the satellite data.

In some embodiments of the method 400 and/or the method 500, the generating by the MLA the weather forecast for the given period of time is for a prediction geographical region, which is larger than the given geographical region.

In some embodiments of the method 400 and/or the method 500, the method further comprises training the second MLA, wherein the second MLA is trained based on a training set, the training set including a training object and a training label; and wherein: the training object comprises the satellite data; the training label comprises a prediction output of the first trained NN, the prediction output being further sequential 3D map.

In some embodiments of the method 400 and/or the method 500, he satellite data comprises: a plurality of layers of photos made by the satellite; a layer of topographical information; a layer that represents the high of sun relative to the horizon; a plurality of layers of meteo data collected by Global Forecast System.

Figure 6:
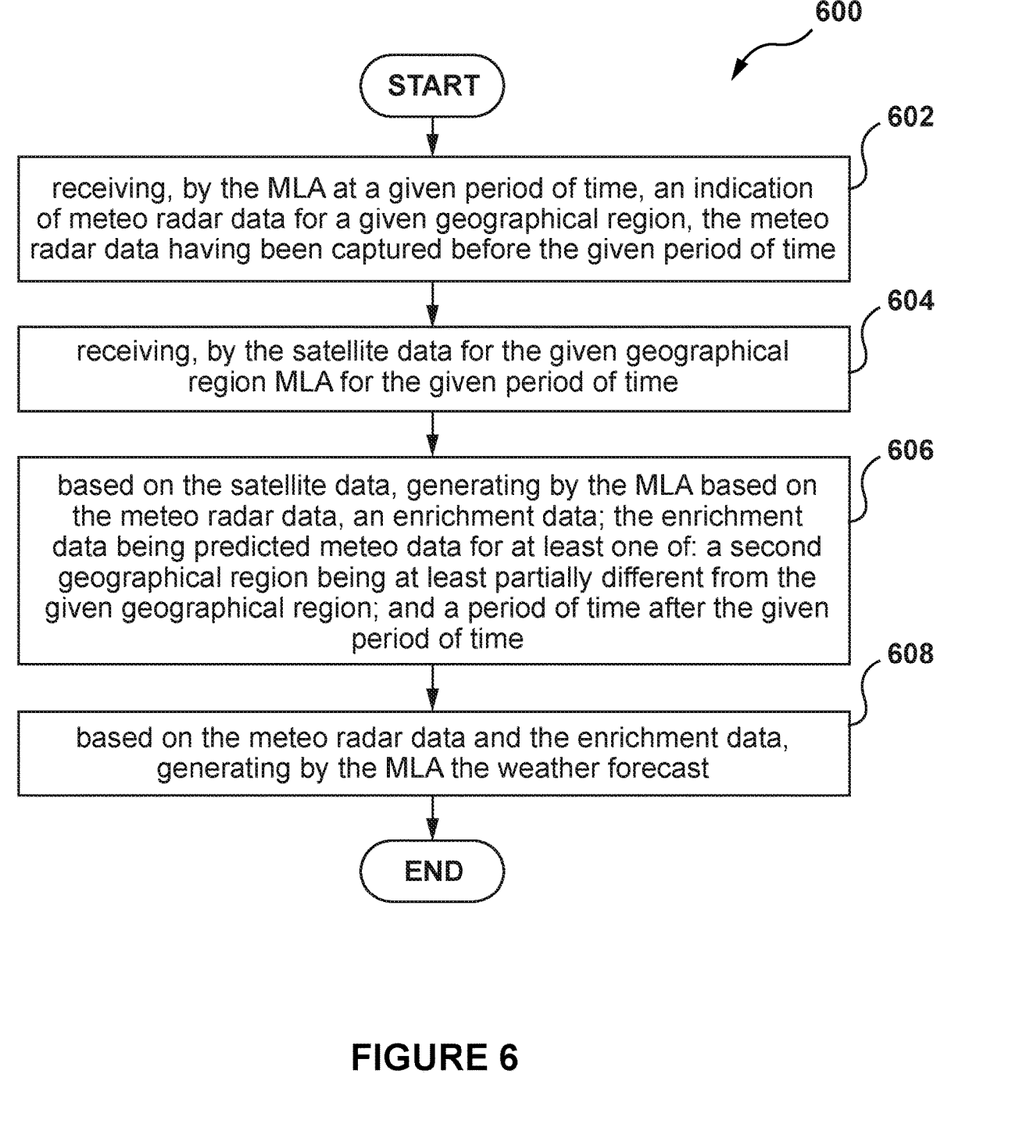
FIG. 6 depicts a flowchart of a method of creating a weather forecast implemented by the server in the system of FIG. 1, the method executed according to yet other additional non-limiting embodiments of the present technology.

With reference to FIG. 6, there is depicted a flow chart of a method 600, the method 600 being executable in accordance with alternative non-limiting embodiments of the present technology.

The method 600 is a method of generating a weather forecast, the method 600 executable by the processor 116 of the server 114, the processor 116 being configured to execute a Machine Learning Algorithm (MLA), such as the above mentioned first MLA 140, the second MLA 150 and the MLATR 160.

Step 602—Receiving, by the MLA at a Given Period of Time, an Indication of Meteo Radar Data for a Given Geographical Region, the Meteo Radar Data Having Been Captured Before the Given Period of Time At step 602, the second MLA 150 receives, at a given period of time, an indication of meteo radar data 126 for a given geographical region, the meteo radar data 126 having been captured before the given period of time.

Step 604—Receiving, by the Satellite Data for the Given Geographical Region MLA for the Given Period of Time At step 604, the second MLA 150 receives satellite data 128 for the given geographical region for the given period of time.

Step 606—Based on the Satellite Data, Generating by the MLA Based on the Meteo Radar Data, an Enrichment Data; the Enrichment Data Being Predicted Meteo Data for at Least One of: a Second Geographical Region Being at Least Partially Different from the Given Geographical Region; and a Period of Time After the Given Period of Time At step 606, based on the satellite data, the second MLA 150 generates an enrichment data; the enrichment data being predicted meteo data for at least one of: a second geographical region being at least partially different from the given geographical region; and a period of time after the given period of time.

Step 608—Based on the Meteo Radar Data and the Enrichment Data, Generating by the MLA the Weather Forecast At step 608, the second MLA 150 based on the meteo radar data and the enrichment data, generates the weather forecast.

It is noted that in the non-limiting embodiments of the present technology, the weather forecast can be for given period of time; a period of time after the given period of time; for given geographical region; for the second geographical region.

Modifications and improvements to the above-described implementations of the present technology may become apparent to those skilled in the art. The foregoing description is illustrative only and is not intended to be in any way limiting. The scope of the present technology is therefore intended to be limited solely by the scope of the appended clauses.

The invention claimed is:

1. A method of generating a weather forecast, the method executable by a server, the server including a processor, the processor configured to execute a Machine Learning Algorithm (MLA), the method comprising:
   receiving, by the MLA at a given period of time, an indication of meteo radar data for a given geographical region, wherein the meteo radar data being represented as a pre-determined number of sequential 3D precipitation maps having been captured before the given period of time;
   receiving, by the MLA at the given period of time, satellite data for the given geographical region;
   generating, by the MLA, a further sequential 3D precipitation map based on the satellite data, which follows the pre-determined number of sequential 3D precipitation maps, the further sequential 3D map being associated with a period of time after the given period of time;
   generating, by the MLA, the weather forecast for the given period of time based on the pre-determined number of sequential 3D precipitation maps and the further sequential 3D precipitation map.

2. The method of claim 1, wherein the weather forecast is a nowcasting weather prediction.

3. The method of claim 2, wherein the nowcasting weather prediction is associated with an ultra-short prediction time span.

4. The method of claim 3, wherein the ultra-short prediction time span is within two hours of the given period of time.

5. The method of claim 1, wherein the generating the weather forecast further comprises generating the weather forecast for a future period of time after the given period of time.

6. The method of claim 3, wherein the generation of the further sequential 3D map comprises applying an optical flow technology.

7. The method of claim 6, the applying the optical flow technology is to generate at least one of:
future 3D precipitation maps based on the pre-determined number of sequential 3D precipitation maps;
future satellite data based on the satellite data.

8. The method of claim 1, wherein the generating by the MLA the weather forecast for the given period of time is for a prediction geographical region, which is larger than the given geographical region.

9. The method of claim 1, wherein the MLA comprises a first MLA and a second MLA.

10. The method of claim 8, wherein the first MLA is configured to predict the further sequential 3D map based on the pre-determined number of sequential 3D precipitation maps.

11. The method of claim 10, wherein the predetermined number is six.

12. The method of claim 10, wherein the first MLA is a Neural Network (NN).

13. The method of claim 10, wherein the second MLA is configured to predict the further sequential 3D precipitation map based on the satellite data.

14. The method of claim 13, wherein the second MLA is a Neural Network (NN).

15. The method of claim 14, wherein the Neural Network (NN) comprises a U-net NN.

16. The method of claim 13, wherein the method further comprises training the second MLA, wherein the second MLA is trained based on a training set, the training set including a training object and a training label; and wherein:
the training object comprises the satellite data;
the training label comprises a prediction output of the first MLA, the prediction output being a further sequential 3D map.

17. The method of claim 16, wherein the satellite data comprises:
a plurality of layers of photos made by the satellite;
a layer of topographical information;
a layer that represents the high of sun relative to the horizon;
a plurality of layers of meteo data collected by a Global Forcast System.

18. A method of generating a weather forecast, the method executable by a server, the server including a processor, the processor configured to execute a Machine Learning Algorithm (MLA), the method comprising:
receiving, by the MLA at a given period of time, an indication of meteo radar data for a given geographical region, wherein the meteo radar data having been captured before the given period of time;
receiving, by the MLA at the given period of time, satellite data for the given geographical region, the meteo radar data being represented as a pre-determined number of sequential 3D precipitation maps having been captured before the given period of time;
generating, by the MLA, an enrichment data based on the satellite data, the enrichment data being a further sequential 3D precipitation map for at least one of:
a second geographical region being at least partially different from the given geographical region; and
a period of time after the given period of time;
generating, by the MLA, the weather forecast based on the meteo radar data and the enrichment data.

19. A method of generating a weather forecast, the method executable by a server, the server including a processor, the processor configured to execute a first Machine Learning Algorithm (MLA), the method comprising:
training the first MLA by:
receiving, by a second MLA at a training period of time, an indication of meteo radar data for a training geographical region, the meteo radar data being represented as a pre-determined number of sequential 3D precipitation maps having been captured before the given period of time;
generating, by the second MLA, a prediction of a further sequential 3D precipitation map, which follows the pre-determined number of sequential 3D precipitation maps, the further sequential 3D map being associated with a period of time after the training period of time;
receiving, by the first MLA at the given period of time, satellite data for the training geographical region;
training the first MLA to generate a prediction of a 3D precipitation map based on the satellite data by providing to the first MLA a training set including:
the satellite data as a training object;
the prediction of the further sequential 3D precipitation map made by the second MLA as a target;
receiving, by the first MLA at a given period of time, satellite data for a given geographical region;
based on the satellite data, generating by the first MLA, a 3D precipitation map for the given geographical region;
based on the 3D precipitation map, generating by the first MLA the weather forecast for the given period of time for the given geographical region.

* * * * *